United States Patent Office 3,348,907
Patented Oct. 24, 1967

3,348,907
PROCESS FOR PREPARING A HIGHLY POROUS
SODIUM PERBORATE
Ludwig Pellens and Helmut Honig, Bad Honningen, and
Rudolf Siegel, Niederbieber, Germany, assignors to
Kali-Chemie Aktiengesellschaft, Hannover, Germany
No Drawing. Filed Apr. 7, 1964, Ser. No. 358,095
Claims priority, application Germany, Apr. 13, 1963,
K 49,477
8 Claims. (Cl. 23—60)

ABSTRACT OF THE DISCLOSURE

Highly porous sodium perborate capable of trickling, having a particle size range of 0.25–1.0 mm. and a bulk weight between 0.25 and 0.45 kg./l. is prepared by adding under stirring at 10–15° C. an aqueous solution of sodium metaborate to an aqueous solution of $H_2O_2$ until crystallization of sodium perborate starts; further adding sodium metaborate solution and $H_2O_2$ solution and maintaining in the reaction mixture an excess of $H_2O_2$ to sodium metaborate in the range of 1.1 to 1.8; reacting the excess $H_2O_2$ with sodium metaborate, and cooling the reaction mixture to about 1° C.

---

This invention relates to the preparation of a highly porous, light sodium perborate capable of trickling, by the reaction of a sodium metaborate solution with hydrogen peroxide.

It has been known that sodium perborate is used in large amounts in the production of washing agents. In order to prevent in the latter separation into component ingredients, it is necessary to extensively adjust the structure of sodium perborate to the structure of the other ingredients of the washing agents. The bulk weight of washing agents marketed at present varies in the range of 0.25 and 0.35 kg./l., while their particle size is rather uniformly distributed in the range below 1 mm. In comparison, the soduim perborate is normally obtained with a bulk weight of about 0.7 kg./l. and with a particle range below 0.6 mm. For better processing, the perborate should be, in addition, freely flowing and resistant to abrasion.

Numerous suggestions for the reduction of the bulk weight of sodium perborate have been made. However, most of the processes suggested for this purpose are not satisfactory, because their application results in the formation of finely crystalline or pulverulent products, so that the trickling capacity is affected.

In order to eliminate this drawback, sodium perborate is heated under pressure and converted into moldings, or it is heated without the application of pressure, or it is mixed with molten sodium perborate. Cementing together several small particles (granulation) results in increasing the diameter of the grain up to 1.5 mm., while pulverulent particles are eliminated, and the product is simultaneously loosened up and has bulk weights in the range between 0.4 and 0.5 kg./l.

Although, as a result of these processes, the grain characteristics of sodium perborate and washing powder have drawn near considerably, all the products thus obtained have the drawback that the sodium perborate obtained by conventional processes must be treated by further steps in order to impart to it the desired structure. This drawback has been likewise overcome by a known process, in which the sodium perborate is allowed to crystallize in the form of porous spherules from a strongly oversaturated solution in the presence of a stabilizer, the oversaturation being thereby 4 to 12 times higher than the value of normal saturation. The crystal cake drawn off by suction contains 30 to 50% mother liquor. After drying, the bulk weight amounts to 0.3 to 0.5 kg./l. and 50 to 70% of the total amount show the desired particle size between 0.25 and 0.75 mm., while the remainder is present in form of undersize grain, in addition to little oversize grain.

It has now been found that in a simple manner and in the absence of a stabilizer a highly porous sodium perborate having a bulk weight between 0.25 and 0.45 kg./l. can be prepared by proceeding in the following manner.

An aqueous solution of sodium metaborate is added under stirring at a temperature between 10 and 15° C. to an equeous solution of hydrogen peroxide until crystallization starts; addition of sodium metaborate as well as of hydrogen peroxide is then continued; thereby the mol ratio hydrogen peroxide: sodium metaborate must be maintained between 1.1 and 1.8, preferably between 1.3 and 1.6. Finally, after the desired completion of precipitation, the hydrogen peroxide present in excess is reacted with additional sodium metaborate. The highly porous spherules obtained containing 50 to 70% of adhering mother liquor, have after drying the desired bulk weight and encompass practically completely the particle range of 0.25 to 1.0 mm. Thus, they correspond in their particle characteristics and flow characteristics exactly to the ingredients of washing compositions.

The process according to the invention has the advantage of maximum simplicity. In preparing the highly porous sphere design the same crystallization apparatus can be used, which has been hitherto used for obtaining the conventional crystal structures. Into a vessel provided with means for stirring and cooling, hydrogen peroxide solution is introduced. Subsequently, further amounts of hydrogen peroxide and sodium metaborate solutions are introduced, e.g. by a dosing pump, in such ratio that always an excess of hydrogen peroxide is present in the apparatus. After the limit of solubility is exceeded, sodium perborate having the highly porous spheric structure precipitates. When the vessel provided with stirring means is filled ¾ to ⅘ of its capacity, in discontinuous operation, the supply of hydrogen peroxide is interrupted and the excess of hydrogen peroxide is reacted by further addition of sodium metaborate, then the reaction mixture is cooled up to 1° C. and the precipitated sodium perborate is filtered off. In order to carry out crystallization continuously, from time to time smaller or larger portions corresponding to the volume of the reactants added in the meantime may be discharged from the stirring vessel into another vessel and the reaction finished in the latter by addition of sodium metaborate, while the reaction between hydrogen peroxide and sodium metaborate is continued without interruption in the main reaction vessel.

It has been further found that the porosity of the spherules is dependent on the excess of hydrogen peroxide in the crystallization lye. At increasing excess, the bulk weight becomes lower, as shown by the following figures:

| Mol-ratio $H_2O_2$:$NaBO_2$: | Bulk weight, kg./liter |
|---|---|
| 1.1–1.2 | 0.35–0.45 |
| 1.2–1.3 | 0.30–0.35 |
| 1.3–1.5 | 0.25–0.30 |

The spherules can be slightly sintered by treating them after drying with hot air and thereby their hardness and resistance to abrasion are somewhat increased. In carrying out the present process, solutions conventionally used for the preparation of sodium perborate from hydrogen peroxide and sodium metaborate can be employed. The temperature of the crystallization lye is kept at 10° to 15° C.

It has been found that the high water content of the highly porous spherules obtained in wet condition from the suction filter, can be considerably reduced by a short treatment with water miscible organic solvents having boiling points not exceeding about 100° C., such as methyl alcohol or ethyl alcohol. Spraying the crystals with a small amount of the solvent is sufficient for this purpose. The proportion of adhering mother liquor was prior to such treatment 54% and after the treatment 37%.

As organic solvents adapted to be used for reducing the amount of the water content of the crystal crop obtained in the manner described above, easily volatile solvents which are miscible with water, having boiling points not exceeding about 100° C. and being normally inert to $H_2O_2$, metaborates and perborates, can be used, e.g. alcohols such as methyl alcohol, ethyl alcohol, propyl alcohol, butyl alcohol etc., ketones such as acetone, methyl ethyl ketone, dioxane, esters such as ethyl formiate, methyl acetate, ethyl acetate, propyl acetate and others. These solvents are effective in reducing the water content, when added to the filter cake in amounts of 1 to 15% based on the weight of the wet filter cake. Furthermore, it will be appreciated that processing and finishing the crystals obtained by the process of this invention is carried out in the same manner as described in detail in the following example.

*Example*

Into a vessel provided with stirring means and having a capacity of 10 liters, 1 liter of aqueous hydrogen peroxide solution of 17%-by volume concentration is introduced and cooled to 10° C. Subsequently, an aqueous hydrogen peroxide solution of 17%-by volume concentration and an aqueous sodium metaborate solution containing 19%-by volume of sodium metaborate are caused to flow into the vessel simultaneously and the temperature is kept at 10° C. by exterior cooling. The supply velocity of said two solutions is adjusted in such manner that the mol-ratio $H_2O_2:NaBO_2$ in the crystallization lye soon reaches the value of 1.2 to 1.3. As soon as the crystallization starts, the mol-ratio $H_2O_2:NaBO_2$ can vary during the further supply of the two solutions, between 1.3 and 1.6. Every 10 minutes, the mol-ratio is determined in a small sample taken from the reaction vessel. Every hour, a portion corresponding in volume to the amount of reactants added during this time, which in this case was one liter is taken from the reaction vessel, introduced into a smaller stirring vessel, into which, under further cooling, sodium metaborate solution is introduced in order to react with the excess hydrogen peroxide, until a mol ratio of 1.0 is attained. Cooling to 1° C. is then effected, and the crop of crystals formed is subjected to filtration with suction. The crystals are sprayed with about .5% methyl alcohol or ethyl alcohol based on the weight of the wet filter cake and then dried in an air-current of 55 to 65° C. Averages of two samples taken in each case in intervals of one hour, has shown the following data:

| No. of sample | Bulk-weight, kg./liter | Amount in the grain range of 0.25—1 mm., percent |
|---|---|---|
| 1 | 0.30 | 72 |
| 2 | 0.32 | 84 |
| 3 | 0.31 | 75 |
| 4 | 0.31 | 87 |
| 5 | 0.32 | 85 |

The term "%-by volume" is used herein to denote the amount in grams dissolved in 100 cm.³ solution. For example, a hydrogen peroxide solution of 17%-by volume contains 17 g. hydrogen peroxide in 100 cm.³ solution.

What we claim is:

1. A process for preparing highly porous sodium perborate capable of trickling, having a particle size range of 0.25 to 1 mm. and having a bulk weight between 0.25 and 0.45 kg./l., by reaction of a sodium metaborate solution with hydrogen peroxide in the absence of a stabilizer, comprising forming a reaction mixture by adding under stirring, at a temperature between 10 and 15° C., an aqueous solution of sodium metaborate to an aqueous solution of hydrogen peroxide, until crystallization of sodium perborate from the reaction mixture starts; then further adding sodium metaborate solution and adding hydrogen peroxide solution to the reaction mixture and thereby maintaining in the reaction mixture an excess of hydrogen peroxide, corresponding to a mol-ratio of hydrogen peroxide to sodium metaborate in the range of 1.1 to 1.8, and after the desired completion of precipitation by crystallization, reacting the excess of hydrogen peroxide present with an additional amount of sodium metaborate, cooling the reaction mixture up to about 1° C. and separating the precipitated sodium perborate from the mother liquor.

2. Process, as claimed in claim 1, in which the excess of hydrogen peroxide in the reaction mixture corresponds to a mol-ratio of hydrogen peroxide to sodium metaborate of 1.3 to 1.6.

3. Process, as claimed in claim 1, in which the crystals formed are separated by filtering under suction and sprayed with an organic water miscible solvent having a boiling point not exceeding about 100° C. and being inert to hydrogen peroxide, metaborates and perborates in order to reduce the amount of aqueous liquid adhering to the crystals.

4. Process according to claim 3 wherein the water miscible organic solvent is an alcohol selected from the group methyl alcohol, ethyl alcohol, propyl alcohol and butyl alcohol.

5. Process according to claim 3 wherein the water miscible organic solvent is a ketone selected from the group acetone and methyl ethyl ketone.

6. Process according to claim 3 wherein the water miscible organic solvent is dioxane.

7. Process according to claim 3 wherein the water miscible organic solvent is an ester selected from the group ethyl formiate, methyl acetate, ethyl acetate and propyl acetate.

8. Process, as claimed in claim 1, in which the crystals formed are dried in a current of air of 55–65° C.

References Cited

UNITED STATES PATENTS 3,131,995   5/1964   Gonze et al. _____ 23—60
3,161,597   12/1964   Young _____ 23—60 X

FOREIGN PATENTS 742,079   12/1955   Great Britain.

OSCAR R. VERTIZ, *Primary Examiner.*

H. T. CARTER, *Assistant Examiner.*